US008676688B2

(12) United States Patent
Sherman et al.

(10) Patent No.: US 8,676,688 B2
(45) Date of Patent: Mar. 18, 2014

(54) METHODS AND SYSTEMS FOR PROVIDING PREFERRED INCOME EQUITY REPLACEMENT SECURITIES

(75) Inventors: Michael Sherman, Brooklyn, NY (US); Steven R. Halperin, New York, NY (US); Paul Robinson, New York, NY (US)

(73) Assignee: Barclays Capital, Inc., New York, NY (US)

( * ) Notice: Subject to any disclaimer, the term of this patent is extended or adjusted under 35 U.S.C. 154(b) by 1566 days.

(21) Appl. No.: 11/471,915

(22) Filed: Jun. 20, 2006

(65) Prior Publication Data

US 2006/0287938 A1    Dec. 21, 2006

Related U.S. Application Data

(60) Provisional application No. 60/692,417, filed on Jun. 20, 2005, provisional application No. 60/756,824, filed on Jan. 6, 2006.

(51) Int. Cl.
*G06Q 40/06* (2012.01)

(52) U.S. Cl.
CPC ..................... *G06Q 40/06* (2013.01)
USPC ....................................... 705/36 R

(58) Field of Classification Search
None
See application file for complete search history.

(56) References Cited

U.S. PATENT DOCUMENTS

| | | | |
|---|---|---|---|
| 7,024,384 B2 * | 4/2006 | Daughtery, III | 705/36 R |
| 7,177,834 B1 | 2/2007 | Maestle | |
| 7,249,077 B2 | 7/2007 | Williams et al. | |
| 7,493,278 B2 | 2/2009 | Jones et al. | |
| 7,599,884 B2 | 10/2009 | van Leeuwen | |
| 7,613,642 B2 | 11/2009 | Ryan | |
| 7,739,165 B2 * | 6/2010 | Zajkowski et al. | 705/35 |
| 2001/0029476 A1 * | 10/2001 | Mallenbaum | 705/35 |
| 2002/0143696 A1 | 10/2002 | Wilson et al. | |
| 2002/0147670 A1 | 10/2002 | Lange | |
| 2002/0198827 A1 | 12/2002 | van Leeuwen | |
| 2003/0200164 A1 | 10/2003 | Jacobs | |
| 2004/0024676 A1 * | 2/2004 | Jones et al. | 705/36 |
| 2004/0133494 A1 * | 7/2004 | Jones et al. | 705/35 |
| 2004/0167849 A1 | 8/2004 | Yass et al. | |
| 2004/0177016 A1 | 9/2004 | Jones et al. | |
| 2004/0236614 A1 | 11/2004 | Keith | |
| 2005/0004853 A1 * | 1/2005 | McGregor et al. | 705/35 |
| 2005/0021435 A1 | 1/2005 | Hakanoglu et al. | |
| 2005/0044023 A1 | 2/2005 | Rotman et al. | |
| 2005/0075959 A1 * | 4/2005 | Woodruff et al. | 705/35 |
| 2005/0075976 A1 | 4/2005 | Woodruff et al. | |
| 2005/0080706 A1 * | 4/2005 | Birle et al. | 705/37 |
| 2005/0091150 A1 | 4/2005 | Woeber | |
| 2005/0102213 A1 * | 5/2005 | Savasoglu et al. | 705/36 |
| 2005/0137967 A1 | 6/2005 | Ryan | |
| 2005/0192882 A1 * | 9/2005 | Butler et al. | 705/35 |
| 2005/0228747 A1 * | 10/2005 | Gumport | 705/37 |
| 2005/0267839 A1 | 12/2005 | Ortner | |
| 2006/0080193 A1 | 4/2006 | McMurtray et al. | |
| 2006/0218069 A1 | 9/2006 | Aberman et al. | |
| 2006/0242045 A1 | 10/2006 | Muldowney | |
| 2006/0277125 A1 * | 12/2006 | Zajkowski et al. | 705/35 |
| 2007/0011068 A1 | 1/2007 | Zajowski | |
| 2007/0100721 A1 | 5/2007 | Sareen | |
| 2007/0106588 A1 * | 5/2007 | Kulak | 705/36 R |
| 2007/0162365 A1 | 7/2007 | Weinreb | |
| 2009/0024535 A1 * | 1/2009 | Kleidman | 705/36 R |

OTHER PUBLICATIONS

"General Growth Properties Supplemental Financial Information", PDF, attached, 2002, description of PIERS.*
Adair, Wendell, "Subordinated Debt Paradoxes", Turnaround Management Association, Jul. 1, 1993. 5 pages.
Robinson, Danielle, "Stanley Works Bring First US Corporate Hybrid", Nov. 18, 2005, Euroweek, Issue 930, pp. 1-7.
Yiu, Enoch, "HKEx Rules Out Warrant Cap", Sep. 15, 2005, South China Morning Post, p. 1.
"Salman's Blog: Valuing Preferred Stock", Nov. 20, 2005, http://salmanaff.blogspot.com/2005/11/valuing-preferred-stock.html.
"Questions and Answers Regarding Exchange Offer", Dec. 30, 1996, Fleet Capital Trust I, http://www.secinfo.com/dRqWm.9tPx.8.htm.
Havlicek, Barbara, Moody's Tool Kit for Hybrid Analysis: An update on Market Developments, Moody's Investor Service, Feb. 20, 2006.
Rating Methodology, Moody's Tool Kit: A Framework for Assessing Hybrid Securities, A Product of the New Instruments Standing Committee, Moody's Investors Service Global Credit Research, Dec. 1999.
Special Comment, An Application of Moody's Tool Kit: Characteristics of a Basket E Mandatorily Convertible Security for Financial Institutions and Corporates, A Product of the New Instruments Standing Committee, Moody's Investors Service Global Credit Research, Nov. 2004.
Rating Methodology, Refinements to Moody's Tool Kit: Evolutionary, Not Revolutionary!, A Product of the New Instruments Committee, Moody's Investors Service Global Credit Research, Feb. 2005.
Special Comment, An Application of Moody's Tool Kit: Characteristics of a Basket C Perpetual Preferred for Financial Institutions and Corporates, A Product of the New Instruments Standing Committee, Moody's Investors Service Global Credit Research, May 2004.

(Continued)

*Primary Examiner* — Bruce I Ebersman
(74) *Attorney, Agent, or Firm* — Morgan, Lewis & Bockius LLP

(57) ABSTRACT

In one aspect, the invention comprises a method comprising issuing perpetual preferred securities that provide non-cumulative dividends with a fixed liquidation preference; wherein valuation of the securities upon redemption or conversion is based on market value of a specified number of common shares, and wherein the securities are operable to receive treasury stock method accounting. In various embodiments: (1) the securities receive C or D Basket treatment from Moody's; (2) the securities receive treasury stock method accounting because, upon conversion or redemption, common shares are issued only with respect to the valuation of the securities in excess of the fixed liquidation preference; and (3) upon conversion or redemption the number of common shares is equal to $(A \times B - C)/B$, where A=a conversion rate, B=price per share of the common shares, and C=the fixed liquidation preference.

11 Claims, No Drawings

(56) References Cited

OTHER PUBLICATIONS

U.S. Appl. No. 11/164,756, Non-Final Office Action mailed Aug. 20, 2008.
U.S. Appl. No. 11/164,756, Final Office Action mailed May 28, 2009.
U.S. Appl. No. 11/164,756, Non-Final Office Action mailed Dec. 28, 2009.
U.S. Appl. No. 11/164,756, Final Office Action mailed Jun. 23, 2009.
U.S. Appl. No. 11/651,375, Non-Final Office Action mailed Apr. 28, 2008.
U.S. Appl. No. 11/651,375, Non-Final Office Action mailed Mar. 4, 2009.
U.S. Appl. No. 11/651,375, Final Office Action mailed Nov. 12, 2009.
U.S. Appl. No. 11/651,375, Non-Final Office Action mailed May 12, 2010.
U.S. Appl. No. 11/651,375, Final Office Action mailed Oct. 13, 2010.

* cited by examiner

METHODS AND SYSTEMS FOR PROVIDING PREFERRED INCOME EQUITY REPLACEMENT SECURITIES

CROSS-REFERENCE TO RELATED APPLICATIONS

This application claims the benefit of U.S. Provisional Application No. 60/692,417, filed Jun. 20, 2005, and the benefit of U.S. Provisional Application No. 60/756,824, filed Jan. 6, 2006. The entire contents of those two provisional applications are incorporated herein by reference.

BACKGROUND AND SUMMARY

Hybrid securities are securities that have some equity characteristics and some debt characteristics. Ratings agencies such as Moody's and Standard & Poor's have created defined "baskets" based on the "equity-like" or "debt-like" content of a security. Securities are classified into baskets meeting specific criteria, and the basket to which a security is assigned determines a specified percentage of equity treatment for which the security qualifies.

For example, Moody's has five baskets (A-E). Securities with an A basket classification are treated as 0% equity and 100% debt. At the other extreme, securities with an E basket classification are treated as 100% equity and 0% debt. The A basket includes dated subordinated debt (with maturity of less than 49 years). The E basket encompasses instruments having five characteristics: mandatory convertible; convertible within three years; subordinated debt, preferred or senior, with accelerated conversion; optional deferral; and cumulative coupon.

In order to assign a hybrid security to a basket, Moody's assesses the instrument's equity-like characteristics. In particular, securities with the following features will be classified as Basket C securities (treated as 50% equity and 50% debt): (a) preferred; (b) perpetual or long-dated; (c) typically non-call 5 or 10 years; (d) optional deferral; (e) non-cumulative dividends; and (f0 replacement language required. Securities classified as Basket D (75% equity and 25% debt) have many of the same features as Basket C securities, the main differences being that the Basket D securities must be perpetual (not merely long-dated) and deferral must be mandatory (not optional).

A preferred embodiment of the present invention comprises methods and systems for providing perpetual preferred income equity replacement securities ("Perpetual PIERS"), which are perpetual convertible preferred securities that achieve equity treatment on an issuer's balance sheet, and are accounted for on a net share settlement basis, using a method similar to that for treasury stock. Perpetual PIERS achieve this accounting treatment through cash settlement of the liquidation preference upon conversion. A conventional cash settlement feature would make PIERS cash redeemable at the option of investors, and therefore would not be treated as equity on the issuer's balance sheet. Perpetual PIERS solve this problem by using a combination of non-convertibility by investors at any time and the issuance of a non-convertible preferred and net shares upon conversion, with cash only deliverable upon an issuer call or change of control.

Perpetual PIERS provide a novel way to achieve high equity content in a highly accretive security that qualifies as shareholder's equity on the balance sheet. The invention, in one aspect, comprises a method and system for providing a convertible security that gets treasury stock accounting while still getting high equity credit from the agencies. Each embodiment described herein achieves this.

In one aspect, the invention comprises a method comprising issuing perpetual preferred securities that provide non-cumulative dividends with a fixed liquidation preference; wherein valuation of the securities upon redemption or conversion is based on market value of a specified number of common shares, and wherein the securities are operable to receive treasury stock method accounting.

In various embodiments: (1) the securities receive C or D Basket treatment from Moody's; (2) the securities receive treasury stock method accounting because, upon conversion or redemption, common shares are issued only with respect to the valuation of the securities in excess of the fixed liquidation preference; (3) the securities are not redeemable or convertible at holder's option; (4) upon conversion or redemption the number of common shares is equal to $(A \times B - C)/B$, where $A$=a conversion rate, $B$=price per share of the common shares, and $C$=the fixed liquidation preference; (5) upon redemption the liquidation preference is paid in cash; (6) the securities are convertible at any time after a specified date into non-convertible preferred stock and common shares; (7) the securities provide holders with preferred stock voting rights and are treated as preferred stock according to GAAP accounting rules; (8) the securities may be redeemed only upon notice of redemption by an issuer; (9) the notice of redemption is preceded by a stock price of common shares achieving at least a specified value for at least a specified period of time; (10) the dividends are increased if a stock price of common shares achieves at least a specified value for at least a specified period of time; and (11) a conversion rate is increased if a stock price of common shares achieves at least a specified value for at least a specified period of time.

In another aspect, the invention comprises a financial instrument comprising one or more perpetual preferred securities operable to provide non-cumulative dividends with a fixed liquidation preference; wherein valuation of the securities upon redemption or conversion is based on market value of a specified number of common shares, and wherein the securities are operable to receive treasury stock method accounting.

In various embodiments: (1) the securities receive C or D Basket treatment from Moody's; (2) the securities receive treasury stock method accounting because, upon conversion or redemption, common shares are issued only with respect to the valuation of the securities in excess of the fixed liquidation preference; (3) the securities are not redeemable or convertible at holder's option; and (4) upon conversion or redemption the number of common shares is equal to $(A \times B - C)/B$, where $A$=a conversion rate, $B$=a stock price of the common shares, and $C$=the fixed liquidation preference.

In another aspect, the invention comprises a method comprising purchasing one or more perpetual preferred securities that provide non-cumulative dividends with a fixed liquidation preference; wherein valuation of the securities upon redemption or conversion is based on market value of a specified number of common shares, and wherein the securities are operable to receive treasury stock method accounting.

In various embodiments: (1) the securities receive C or D Basket treatment from Moody's; and (2) the securities receive treasury stock method accounting because, upon conversion or redemption, common shares are issued only with respect to the valuation of the securities in excess of the fixed liquidation preference.

DETAILED DESCRIPTION

Cost of financing: Perpetual PIERS provide lower pre-tax costs than high-equity-content alternatives, and a higher conversion premium than mandatory structures. Perpetual PIERS also provide investors with a true equity option and yield potentially beyond the call date, allowing for attractive pricing relative to mandatory and non-convertible perpetual preferred structures.

Earnings per share ("EPS") efficiency: Perpetual PIERS have a low fixed dividend and qualify for treasury stock method of accounting, resulting in no additional shares in the diluted share count at issue. Shares enter the share count only to the extent the security is in-the-money. Perpetual PIERS also avoid the 3-year conversion "cliff" that applies to mandatory units, since the Perpetual PIERS are convertible only upon issuer call.

Share dilution: Upon a call for conversion, an issuer cash settles the liquidation preference and only issues shares for the in-the-money amount.

Equity content: Perpetual PIERS provide the ability to achieve C or D Basket treatment from Moody's, with certain enhancements. They also provide 100% credit from S&P for financial institutions, up to certain limitations. For non-financial institutions, Perpetual PIERS can achieve "intermediate" equity credit from S&P (40-60%). An issuer will have to covenant to refinance the security with a security of equal or greater equity content to maximize equity credit from rating agencies.

Balance sheet: Perpetual PIERS are treated as shareholder's equity on the balance sheet.

TABLE 1

Product Comparison

| | PIES/PIES Units[1] | Trust PIERS Units[2] | Perpetual PIERS |
|---|---|---|---|
| Cost | PIES tend to be a higher cost alternative as investors take downside risk and forego initial stock upside. | For most Issuers, Trust PIERS Units are the least costly and most tax efficient convertible funding alternative. | Higher after-tax cost than Trust PIERS units and PIES due to the lack of tax deductibility. Significantly lower cash cost than straight preferred alternatives. |
| Rating Agency Credit | Moodys: 100% equity if preferred underlying, 75% equity/25% debt in tax-deductible unit form. S&P: 100% capital credit up to 35% of ATE. | Moody's: 100% equity on warrant component, 0% equity/100% debt on Trust Preferred. S&P: 100% on warrant component, 100% on Trust Preferred up to 10% ATE. | Moody's: 50-75% equity credit, depending on features. S&P: 100% equity credit for financial institutions, subject to limits; 40-60% equity credit for non-financial institutions. |
| Structural Simplicity | Separable unit with mandatory conversion and debt remarketing. Complicated tax and accounting analysis. | Separable unit; no remarketing required Complicated accounting analysis. Straight forward tax analysis. | Single investment with limited investor conversion right; partial cash settlement only upon an issuer call. Straight-forward tax and accounting analysis. |
| Balance Sheet | PIES Units: Debt on balance sheet. PIES (with preferred): Preferred on balance sheet. Zero-value forward contract and associated contract fees. | 100% book TCE on warrant component. Balance is junior subordinated debt and accretes over 49 years. | True preferred on balance sheet. |
| Accretion/ Dilution | PIES generally entail the greatest share dilution, with recognition of all the shares upon delivery in year 3. Treasury stock method until year 3. Mandatory full share dilution in year 3. | Treasury stock method until conversion. May be fully share-settled or net share-settled upon a call for conversion. | Can achieve Treasury stock if cash settlement and non-convertibility is used, however it will receive less equity credit from Moody's. Otherwise, if-converted accounting results in the more dilutive of the shares or the interest expense. |

[1] PIES are Premium Income Equity Securities. In one form, each PIES unit consists of a stock purchase contract and a senior unsecured note issued by the company with a face amount of $X. Each PIES purchase contract includes the right to receive payments from the company on the purchase contract and obligates the holder to purchase a number of shares of the company's common stock on a specified Date. The number of shares of common stock receivable on the settlement date is between Y and Z shares per unit depending on the average trading price of the company's common stock prior to the settlement date.

[2] Trust PIERS are Trust PIERS units, the components of which are preferred securities issued by a business trust formed by a Company and a warrant to purchase common stock of Company, and $N aggregate principal amount of Senior Notes. The senior notes offering is conditioned on the completion of the Trust PIERS units offering. The Trust PIERS units are separable into their components after initial issuance and may subsequently be recombined at the option of the holder. The trust preferred security component of the Trust PIERS units entitle the holders to a fixed quarterly cash distribution, which will be determined upon pricing. The warrant component of the Trust PIERS units is exercisable for a fixed number of shares (subject to customary antidilution adjustments) of Company common stock, at a price also to be determined upon pricing.

Term Sheet 1 in Appendix 1 sets forth proposed terms related to an offering of convertible preferred securities according to a first embodiment.

Second Embodiment

Term Sheet 2 in Appendix 2 is an exemplary term sheet for a second embodiment of Perpetual PIERS. There are two significant changes from the first embodiment.

1. In the first embodiment the Perpetual PIERS were convertible only upon notice of redemption by the issuer. In the second embodiment, Perpetual PIERS are convertible at any time into non-convertible preferred stock and common stock.

2. In the first embodiment, the dividend rate would increase if the common stock price hit a specified level. In the second embodiment, instead of the dividend rate increasing, the conversion rate increases if the stock price trigger is met.

Structure: Perpetual Convertible Preferred on balance sheet with provisional call after 3-5 years. Upon conversion, issuer delivers cash or non-convertible perpetual preferred stock at the same dividend rate as the PIERS, plus common stock for the in-the-money amount.

EPS and cost efficiency: Perpetual PIERS qualify for net share settled accounting. No additional shares in the diluted share count at issue; shares only included in the diluted share count to the extent the security is in-the-money. Perpetual PIERS avoid the 3-year conversion "cliff" that applies to mandatory units, and provide issuers with a lower initial cost than traditional convertible preferreds and mandatories.

Equity credit: Moody's: 50-75% (Basket C or D). Basket D requires (i) capital replacement intent and mandatory deferral trigger, or (ii) "binding" capital replacement language. S&P: 100% for financial institutions, subject to limitations; 40-40% for non-financial institutions.

Term Sheet 2 in Appendix 2 sets forth exemplary terms related to an offering of convertible preferred securities used in a second embodiment.

Embodiments of the present invention comprise computer components and computer-implemented steps that will be apparent to those skilled in the art. For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

For example, all calculations preferably are performed by one or more computers. Moreover, all notifications and other communications, as well as all data transfers, to the extent allowed by law, preferably are transmitted electronically over a computer network. Further, all data preferably is stored in one or more electronic databases.

TABLE 2

Product Comparison

| | PIES/PIES Units | Trust PIERS Units | Perpetual PIERS |
|---|---|---|---|
| Cost | PIES tend to be a higher cost alternative as investors take downside risk and forego initial stock upside. | For most Issuers, Trust PIERS Units are the least costly and most tax efficient convertible funding alternative. | Higher after-tax cost than Trust PIERS units and PIES due to the lack of tax deductibility. Significantly lower cash cost than straight preferred alternatives. |
| Rating Agency Credit | Moodys: 100% equity if preferred underlying, 75% equity/25% debt in tax-deductible unit form. S&P: 100% capital credit up to 35% of ATE. | Moody's: 100% equity on warrant component, 0% equity/100% debt on Trust Preferred. S&P: 100% on warrant component, 100% on Trust Preferred up to 10% ATE. | Moody's: 50-75% equity credit, depending on features. S&P: 100% equity credit for financial institutions, subject to limits; 40-60% for non-financial institutions. |
| Structural Simplicity | Separable unit with mandatory conversion and debt remarketing. Complicated tax and accounting analysis. | Separable unit; no remarketing required. Complicated accounting analysis. Straight forward tax analysis. | Single investment with limited investor conversion right; convertible into nonconvertible preferred and net shares or cash and net shares upon issuer call. Straight-forward tax and accounting analysis. |
| Balance Sheet | PIES Units: Debt on balance sheet PIES (with preferred): Preferred on balance sheet. Zero-value forward contract and associated contract fees. | 100% book TCE on warrant component. Balance is junior subordinated debt and accretes over 49 years. | True preferred on balance sheet. |
| Accretion/ Dilution | PIES generally entail the greatest share dilution, with recognition of all the shares upon delivery in year 3. Treasury stock method until year 3. Mandatory full share dilution in year 3. | Treasury stock method until conversion, May be fully share-settled or net share-settled upon a call for conversion. | Structured to achieve net share settled accounting; dilutive only to extent in-the-money. |

APPENDIX 1

TERM SHEET 1

| | |
|---|---|
| Securities Offered | "Company" issues Perpetual Preferred Income Equity Replacement Securities (the "Perpetual PIERS") to third-party investors. The PIERS are perpetual, non-cumulative preference shares issued by the Company that are convertible upon redemption based on the value of a fixed number of common shares of the Company. |
| Liquidation Preference | $50 per Perpetual PIERS. |
| Maturity | Perpetual. |
| Dividends | Non-cumulative quarterly dividends on the Perpetual PIERS will be paid, as and if declared at the discretion of the Company's Board of Directors, on quarterly payment dates at a fixed dividend rate equal to [x]% (the "Dividend Rate") of the liquidation preference. [The Company cannot make payments on the Perpetual PIERS for any dividend period in which the Company fails to maintain a Fixed Charge Coverage Ratio of at least [x] or a Leverage Ratio of less than [y] for the prior fiscal quarter (a "Mandatory Deferral Period"). During a Mandatory Deferral Period, the company may make dividend payments in stock in lieu of cash as described below in "Mandatory Deferred Dividends Payment in Stock".] |
| Rankings | Dividends: With respect to the payment of dividends on the Perpetual PIERS, the Perpetual PIERS will rank junior to all Company indebtedness and senior to common shares of the Company. Further, to the extent that the Company makes dividend payments on its common shares, full dividends on the Perpetual PIERS are required to be paid. In the event that the Company ceases to make dividend payments on the Perpetual PIERS, the Company may not make cash dividend payments on its common shares. Liquidation: Upon a liquidation of the Company, the Perpetual PIERS will rank junior to all Company indebtedness, pari passu with outstanding preferred stock, if any, and senior to Company common shares with respect to the assets available for distribution. The liquidation preference of the PIERS will be $50. |
| Option to Make Mandatory Deferred Dividends Payment in Stock | In the event that the Company fails to make any quarterly dividend payment due to a Mandatory Deferral Period, dividends may be paid in shares based on a [%] discount to the 10 trading day average immediately preceding such distribution date; provided that such shares are freely tradeable or the company has an effective S-3 resale registration statement for the sale of such shares. |
| Conversion Right | Perpetual PIERS will be redeemable for cash and, if applicable, shares of common stock based on an initial conversion ratio of [ ] shares of common stock for each $50 in stated liquidation amount of Perpetual PIERS (equivalent to an initial conversion price of approximately $[ ] per share of common stock), subject to customary anti-dilution adjustments, pursuant to the settlement provisions as described under "Optional Redemption by the Company". Perpetual PIERS will not be convertible at the option of holders at any time. Perpetual PIERS will be deemed to be converted on the settlement date upon a notice of optional redemption by the Company as described under "Optional Redemption by the Company." |
| Optional Redemption by the Company | After the [$3^{rd}$] anniversary of the issuance of the Perpetual PIERS, if for 20 trading days within any period of 30 consecutive trading days, including the last day of such period, the closing price of its common shares on the New York Stock Exchange or any other nationally recognized exchange exceeds [130%] of the then prevailing Conversion Price then, the Company may, at its option, provide notice of redemption. The Perpetual PIERS will be automatically redeemed 23 trading days after the notice of redemption. On the settlement date, all holders will receive cash and, if applicable, shares of common stock in an amount calculated as follows: a cash amount equal $50 per each Perpetual PIERS; and if the product of the applicable stock price and the conversion ratio then in effect exceeds $50, a number of shares of common stock equal to (i) (a) the conversion ratio then in effect multiplied by (b) the applicable stock price, (c) minus $50, divided by (ii) the applicable stock price. The "applicable stock price" means the average closing sale price of a share of common stock over the 20 trading-day period (the "cash settlement averaging period") beginning on the trading day immediately following the notice of redemption. The settlement date will occur 23 trading days after the notice of redemption. |
| Dividend Step-up | After the [$3^{rd}$] anniversary of the issuance of the Perpetual PIERS, if for 10 trading days within any period of 30 consecutive trading |

APPENDIX 1-continued

TERM SHEET 1

| | |
|---|---|
| | days, including the last day of such period, the closing price of its shares on the New York Stock Exchange or any other nationally recognized exchange exceeds [200%] of the then prevailing Conversion Price then the dividend rate on the Perpetual PIERS will increase to % [comparable yield at issue] per annum on the liquidation preference of the Perpetual PIERS. |
| Change of Control | If a change of control occurs, investors can elect to have the Perpetual PIERS placed by a placement agent as non-convertible preferred stock with the following terms:<br>liquidation preference of $50<br>distribution rate that will be reset to the rate determined by the placement agent as the floating rate market yield for a $50 non-convertible preferred stock at that time with substantially the same terms and conditions as the Perpetual PIERS.<br>the company may elect to redeem the preferred stock, in whole but not in part, for cash at a redemption price equal to $50 plus accrued and unpaid distributions to the redemption date, (1) at any time during the 30 days beginning on the 90th day after the change of control occurs and (2) at any time, beginning on the fifth anniversary of the change of control date, for the remaining life of the preferred stock.<br>If the placement agent cannot place the preferred stock at a price of $50, a "failed placement" will be deemed to occur.<br>Upon a failed placement, investors who have elected to place their Perpetual PIERS will receive reset non-convertible preferred stock and, if applicable, shares of common stock on the settlement date as described below. The reset rate will equal Libor plus bps [the comparable floating rate yield at issue plus 100 bps].<br>If investors elect to have their Perpetual PIERS placed as non-convertible preferred stock and the product of the applicable stock price and the conversion ratio then in effect, including the change of control make whole, exceeds the stated liquidation amount of the Perpetual PIERS, then they will also receive a number of shares of common stock per Perpetual PIERS equal to (i) (a) the conversion ratio then in effect multiplied by (b) the applicable stock price, (c) minus $50, divided by (ii) the applicable stock price.<br>If a change of control occurs and the market price of a share of common stock for the 5 trading days immediately preceding the change of control effective date ("the average change of control stock price") is above the stock price at issue (subject to anti-dilution adjustments) and below [300%] of the stock price at issue (subject to anti-dilution adjustments), the conversion ratio of the Perpetual PIERS will increase pursuant to a table of predetermined values ("change of control make whole").<br>Notwithstanding the foregoing, in the case of a "public acquirer" change of control, the company may, in lieu of the change of control make whole, elect to adjust the conversion ratio ("public acquirer option") and the related redemption settlement obligation such that from and after the effective date of such public acquirer fundamental change, holders that convert their Perpetual PIERS (pursuant to the settlement procedures of the Perpetual PIERS as described above) into a number of shares of public acquirer common stock (as defined below) by multiplying the conversion ratio in effect immediately before the public acquirer fundamental change by a fraction:<br>the numerator of which will be (i) in the case of a share exchange, consolidation, merger or binding share exchange, pursuant to which our common stock is converted into cash, securities or other property, the average value of all cash and any other consideration (as determined by our board of directors) paid or payable per share of common stock or (ii) in the case of any other public acquirer fundamental change, the average of the last reported sale prices of our common stock for the five consecutive trading days prior to but excluding the effective date of such public acquirer fundamental change, and the denominator of which will be the average of the last reported sale prices of the public acquirer common stock for the five consecutive trading days commencing on the trading day next succeeding the effective date of such public acquirer fundamental change.<br>If the issuer elects the public acquirer option, then the optional redemption date, liquidation preference, and other terms of the Perpetual PIERS will not change except for the conversion ratio and obligation as described under the public acquirer option. |

APPENDIX 1-continued

TERM SHEET 1

| | |
|---|---|
| | However, holders will still have the right to elect to have the Perpetual PIERS placed as non-convertible preferred stock as described above. |
| Anti-Dilution Protection | The conversion ratio will be subject to customary anti-dilution adjustments. |
| Dividend Protection | The conversion ratio will be adjusted for distributions of cash by the company to common shareholders, excluding any dividend or distribution in connection with its liquidation, dissolution or winding up or quarterly cash dividend on its common stock to the extent that the aggregate cash dividend per share of its common stock in any quarter does not exceed $[ ] (the "dividend threshold amount"). The dividend threshold amount is subject to adjustment on the same basis as the conversion ratio, provided that no adjustment will be made to the dividend threshold amount for any adjustment made to the conversion ratio pursuant to this clause. If an adjustment is required to be made under this clause as a result of a distribution that is a quarterly dividend, the adjustment will be based upon the amount by which the distribution exceeds the dividend threshold amount. If an adjustment is required to be made under this clause as a result of a distribution that is not a quarterly dividend, the adjustment will be based upon the full amount of the distribution.<br>If the company makes a dividend or distribution as described above, then the conversion ratio will be adjusted by multiplying the conversion ratio then in effect by a fraction:<br>the numerator of which will be the conversion ratio then in effect; and<br>the denominator of which will be the conversion ratio then in effect minus the amount per share of such dividend or distribution (as determined above). |
| Voting Rights | Typical preferred stock voting rights. If dividends are not paid for 6 quarterly dividend periods, investors in the Perpetual PIERS are entitled to elect 2 members to the company's Board of Directors. |
| Accounting Treatment | PIERS are treated as GAAP-Equity on the Balance Sheet as "Preferred Stock." The book value of the Perpetual PIERS will equal the $50 liquidation preference. For Income Statement purposes, the Perpetual PIERS will be treated under the treasury stock method of accounting so that additional shares will only be included in the diluted share count to the extent that the conversion value of the Perpetual PIERS exceeds $50. |

APPENDIX 2

TERM SHEET 2

| | |
|---|---|
| Securities Offered | [ ] (the "Company") issues Perpetual Preferred Income Equity Replacement Securities (the "Perpetual PIERS") to third-party investors. |
| Liquidation Preference | $50 per Perpetual PIERS. |
| Maturity | Perpetual. |
| Dividends | Non-cumulative quarterly dividends on the Perpetual PIERS will be paid, as and if declared at the discretion of the Company's Board of Directors, on quarterly payment dates at a fixed dividend rate equal to [x]% (the "Dividend Rate") of the liquidation preference. [If not paid in cash, dividends may be settled in common stock, or a combination of cash and common stock, in the method described below, under "Payment of Dividends in Stock".] |
| Rankings | Dividends: With respect to the payment of dividends on the Perpetual PIERS, the Perpetual PIERS will rank junior to all Company indebtedness and senior to common shares of the Company. Further, to the extent that the Company makes dividend payments on its common shares, full dividends on the Perpetual PIERS are required to be paid. In the event that the Company ceases to make dividend payments on the Perpetual PIERS, the Company may not make cash dividend payments on its common shares.<br>Liquidation: Upon a liquidation of the Company, the Perpetual PIERS will rank junior to all Company indebtedness, pari passu with outstanding preferred stock, if any, and senior to Company common shares with respect to the assets available for distribution. The liquidation preference of the PIERS will be $50. |
| [Payment of Dividends in Stock | Any quarterly dividend payment may be paid in shares of common stock based on a [%] discount to the 10 trading day average immediately preceding such distribution date; provided that such shares are freely tradeable or the company has an effective S-3 resale registration statement for the sale of such shares, or such shares can be delivered pursuant to an exemption to the registration requirements of the '33 Act.] |

APPENDIX 2-continued

TERM SHEET 2

| | |
|---|---|
| Conversion Right | The holders of Perpetual PIERS shall have the right to convert into shares of perpetual preferred stock issued by the Company and, if applicable, shares of Company common stock.<br>The Perpetual PIERS will be convertible based on an initial conversion rate of [ ] shares of Company common stock for each $50 in stated amount of Perpetual PIERS (equivalent to an initial conversion price of approximately $[ ] per share of Company common stock), subject to customary anti-dilution adjustments. Upon conversion, holders will receive for each $50 stated amount of Perpetual PIERS:<br>$50 liquidation preference of perpetual preferred stock issued by the Company with the terms described below under "Preferred Stock", provided, however, that upon mandatory conversion, holders will receive $50 in cash in lieu of perpetual preferred stock; and<br>if the product of the applicable stock price and the conversion rate then in effect exceeds $50, a number of shares of Company common stock equal to (i) (a) the conversion rate then in effect multiplied by (b) the applicable stock price, minus (c) $50, divided by (ii) the applicable stock price.<br>The "applicable stock price" means the average closing sale price of a share of Company common stock over the 20 trading-day period (the "stock settlement averaging period") beginning on the trading day immediately following the redemption date.<br>The settlement date will occur 23 trading days after the conversion date. |
| Mandatory Conversion | The Company may, at its option, cause the PIERS to be automatically converted. The Company may exercise its conversion right, only after the $3^{rd}$ anniversary of the issuance of the Perpetual PIERS, if for 20 trading days within any period of 30 consecutive trading days, including the last day of such period, the closing price of its common shares on the New York Stock Exchange or any other nationally recognized exchange exceeds 130% of the then prevailing Conversion Price. If the Company elects automatic conversion, it will be required to redeem the perpetual preferred stock issued upon conversion 30 days after the automatic conversion date of the Perpetual PIERS. |
| Optional Redemption by the Company | The Company may not redeem the Perpetual PIERS at its option. |
| Preferred Stock | Upon any conversion of Perpetual PIERS, other than a mandatory conversion, the perpetual preferred stock received by holders will have the following terms:<br>a dividend rate equal to the distribution rate of the Perpetual PIERS, with the same $50 liquidation preference per share;<br>redeemable in cash at a price equal to the liquidation preference upon a change of control or at any time following [ ] (3-5 years after issuance);<br>mandatorily redeemable in cash at a price equal to the liquidation preference upon any mandatory conversion of the Perpetual PIERS, the perpetual preferred stock will be redeemed on the date [30] calendar days following the mandatory conversion of the Perpetual PIERS;<br>subject to remarketing at the election of the holders as described under "Remarketing of Perpetual Preferred Stock"; and<br>the same capital replacement provisions as the Perpetual PIERS. |
| Remarketing of Perpetual Preferred Stock | Unless the perpetual preferred stock is called for redemption, holders may elect, for 10 business days following a change of control of the Company, to have their perpetual preferred stock placed by a placement agent with the following terms:<br>a dividend rate that will be reset to the rate determined by the placement agent as the fixed or floating rate market yield (LIBOR-based) for the perpetual preferred stock, with no dividend reset provision; and<br>optional redemption provisions specified by the Company prior to the date of the placement.<br>Except as set forth above, the terms of the perpetual preferred stock will remain the same following the placement.<br>If the placement agent cannot place the remarketed preferred security at a price of $50 plus accrued and unpaid dividends to the placement date prior to the $21^{st}$ business day following any change of control, a "failed placement" will be deemed to occur.<br>The placement agent will attempt to remarket the perpetual preferred stock on the $6^{th}$, $11^{th}$, $16^{th}$ and $21^{st}$ business days following the effective date of a change of control for settlement on the $24^{th}$ business day following a change of control. Holders must elect to participate in the remarketing within 10 business days following the change of control. Holders of Perpetual PIERS must convert their Perpetual PIERS during such 10 business day period in order to elect to participate in the remarketing.<br>Upon a failed placement, investors who have elected to place their perpetual preferred stock will retain such stock with a reset dividend rate and the perpetual preferred stock will be redeemable at any time by the Company. The reset rate will equal LIBOR plus bps [equivalent to the |

APPENDIX 2-continued

TERM SHEET 2

| | |
|---|---|
| | spread over LIBOR at issue of the comparable floating rate yield at issue plus 100 bps]. |
| Increase in Conversion Rate | After the [$3^{rd}/5^{th}$] anniversary of the issuance of the Perpetual PIERS, if for 20 trading days (whether or not consecutive) in the period of 30 consecutive trading days ending on the last trading day of a fiscal quarter of the Company, the closing price of the Company's common stock on the New York Stock Exchange or any other nationally recognized exchange exceeds [200%] of the then prevailing Conversion Price, then beginning with the first day of the next fiscal quarter (and only for such fiscal quarter), the conversion rate on the Perpetual PIERS will increase at the per annum rate of % [comparable yield at issue plus 100 basis points], with such increase to take effect, unless the Perpetual PIERS have previously been redeemed, on the first day of the following fiscal quarter. |
| Change of Control Make Whole | If a change of control occurs where the market price of a share of common stock for the 5 trading days immediately preceding the change of control effective date ("the average change of control stock price") is above the stock price at issue (subject to anti-dilution adjustments) and below [300%] of the stock price at issue (subject to anti-dilution adjustments), the conversion rate of the Perpetual PIERS will increase pursuant to a table of predetermined values ("change of control make whole"). Notwithstanding the foregoing, in the case of a "public acquirer" change of control, the Company may, in lieu of the change of control make whole, elect to adjust the conversion rate ("public acquirer option") and the related redemption settlement obligation such that from and after the effective date of such public acquirer fundamental change, holders may convert their Perpetual PIERS into nonconvertible preferred stock and shares of common stock of the public acquirer (pursuant to the settlement procedures of the Perpetual PIERS as described above) based on a conversion rate equal to the conversion rate in effect immediately before the public acquirer fundamental change multiplied by a fraction: the numerator of which will be (i) in the case of a share exchange, consolidation, merger or binding share exchange, pursuant to which our common stock is converted into cash, securities or other property, the average value of all cash and any other consideration (as determined by our board of directors) paid or payable per share of common stock or (ii) in the case of any other public acquirer fundamental change, the average of the last reported sale prices of our common stock for the five consecutive trading days prior to but excluding the effective date of such public acquirer fundamental change, and the denominator of which will be the average of the last reported sale prices of the public acquirer common stock for the five consecutive trading days commencing on the trading day next succeeding the effective date of such public acquirer fundamental change. If the issuer elects the public acquirer option, then the redemption provision, liquidation preference, and other terms of the Perpetual PIERS will not change except for the conversion rate and obligation as described under the public acquirer option and the terms of the preferred stock will not change except that it will be issued by the public acquirer. |
| Anti-Dilution Protection | The conversion rate will be subject to customary anti-dilution adjustments, including Dividend. |
| Dividend Protection | The conversion rate will be adjusted for distributions of cash by the company to common shareholders, excluding any dividend or distribution in connection with its liquidation, dissolution or winding up or quarterly cash dividend on its common stock to the extent that the aggregate cash dividend per share of its common stock in any quarter does not exceed $[regular common stock cash dividend at issuance] (the "dividend threshold amount"). The dividend threshold amount is subject to adjustment on the same basis as the conversion rate, provided that no adjustment will be made to the dividend threshold amount for any adjustment made to the conversion rate pursuant to this clause. If an adjustment is required to be made under this clause as a result of a distribution that is not a regular quarterly dividend, the dividend threshold amount will be deemed to be zero. If the company makes a dividend or distribution as described above, then the conversion rate will be adjusted by multiplying the conversion rate then in effect by a fraction: the numerator of which will be the current market price of the common stock minus the dividend threshold amount; and the denominator of which will be the current market price of the common stock minus the amount per share of such dividend or distribution. |
| Voting Rights | Typical preferred stock voting rights. If dividends are not paid for 6 quarterly dividend periods, whether or not consecutive, investors in the Perpetual PIERS are entitled to elect two members to the company's Board of Directors. |
| Accounting Treatment | Perpetual PIERS are treated as GAAP-Equity on the Balance Sheet as "Preferred Stock." The book value of the Perpetual PIERS will equal the $50 liquidation preference. For Income Statement purposes, the Perpetual |

APPENDIX 2-continued

TERM SHEET 2

| | |
|---|---|
| | PIERS will be treated under the "if converted" method of accounting so that additional shares will only be included in the diluted share count to the extent that the conversion value of the Perpetual PIERS exceeds $50, and the dividend associated with the perpetual preferred will reduce earnings available for distribution. |
| Capital Replacement Provision | It is the Company's intention that the Perpetual PIERS and the perpetual preferred stock issuable upon conversion of the Perpetual PIERS may only be redeemed with proceeds from the issuance of a security with equal or greater equity content than the Perpetual PIERS. |

We claim:

1. A system comprising:

memory operable to store at least one program; and at least one processor communicatively coupled to the memory, in which the at least one program, when executed by the at least one processor, causes the at least one processor to perform the following steps:

access and process data regarding terms and conditions of perpetual preferred securities that provide non-cumulative dividends with a fixed liquidation preference;

access and process a valuation of said perpetual preferred securities upon redemption for a specified number of common shares or conversion to the specified number of common shares, wherein said valuation is based on a market value of the specified number of common shares, access and process data regarding treasury stock method accounting of said perpetual preferred securities; and upon redemption for the specified number of common shares or conversion to the specified number of common shares, facilitate the issuance of the specified number of common shares;

wherein upon redemption for the specified number of common shares or conversion to the specified number of common shares, said specified number of common shares is equal to $(A \times B - C)/B$, where $A$=a conversion rate, $B$=price per share of said specified number of common shares, and $C$=said fixed liquidation preference.

2. The system of claim 1, wherein said perpetual preferred securities receive C or D Basket treatment from Moody's.

3. The system of claim 1, wherein said perpetual preferred securities receive treasury stock method accounting because, upon redemption for the specified number of common shares or conversion to the specified number of common shares, the specified number of common shares are issued only with respect to said valuation of said perpetual preferred securities in excess of said fixed liquidation preference.

4. The system of claim 1, wherein said perpetual preferred securities are not redeemable for the specified number of common shares or convertible to the specified number of common shares at an option of a holder of said perpetual preferred securities.

5. The system of claim 1, wherein upon redemption for the specified number of common shares said liquidation preference is paid in cash.

6. The system of claim 1, wherein said perpetual preferred securities are convertible at any time after a specified date into non-convertible preferred stock and the specified number of common shares.

7. The system of claim 1, wherein said perpetual preferred securities provide holders with preferred stock voting rights and are treated as preferred stock according to GAAP accounting rules.

8. The system of claim 1, wherein said perpetual preferred securities are redeemable for the specified number of common shares only upon notice of redemption by an issuer.

9. The system of claim 8, wherein said notice of redemption is preceded by a stock price of the specified number of common shares achieving at least a specified value for at least a specified period of time.

10. The system of claim 1, wherein said non-cumulative dividends are increased if a stock price of the specified number of common shares achieves at least a specified value for at least a specified period of time.

11. The system of claim 1, wherein the conversion rate is increased if a stock price of the specified number of common shares achieves at least a specified value for at least a specified period of time.

* * * * *